US012307969B2

(12) United States Patent
Byun et al.

(10) Patent No.: US 12,307,969 B2
(45) Date of Patent: May 20, 2025

(54) DISPLAY APPARATUS

(71) Applicant: Samsung Display Co., Ltd., Yongin-si (KR)

(72) Inventors: Minwoo Byun, Yongin-si (KR); Wonkyu Kwak, Yongin-si (KR); Jihyun Ka, Yongin-si (KR); Minjoo Kim, Yongin-si (KR); Donghwan Jeon, Yongin-si (KR); Seoni Jeong, Yongin-si (KR); Sungchan Hwang, Yongin-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 0 days.

(21) Appl. No.: 18/475,332

(22) Filed: Sep. 27, 2023

(65) Prior Publication Data

US 2024/0265869 A1 Aug. 8, 2024

(30) Foreign Application Priority Data

Feb. 8, 2023 (KR) ........................ 10-2023-0016993

(51) Int. Cl.

*G09G 3/3233* (2016.01)
*G09G 3/3266* (2016.01)
*G09G 3/3275* (2016.01)

(52) U.S. Cl.

CPC ......... *G09G 3/3233* (2013.01); *G09G 3/3266* (2013.01); *G09G 3/3275* (2013.01);
(Continued)

(58) Field of Classification Search

CPC ............... G09G 3/3233; G09G 3/3275; G09G 2300/0852; G09G 2300/0819;
(Continued)

(56) References Cited

U.S. PATENT DOCUMENTS 9,858,863 B2 1/2018 Kim et al.
11,470,729 B2 10/2022 Kim et al.
(Continued)

FOREIGN PATENT DOCUMENTS

KR 10-2015-0077710 7/2015
KR 10-2017-0031321 3/2017
(Continued)

*Primary Examiner* — Xuemei Zheng
(74) *Attorney, Agent, or Firm* — KILE PARK REED & HOUTTEMAN PLLC

(57) ABSTRACT

A display apparatus including pixels, each including a driving transistor comprising a first terminal, a second terminal, a first gate, and a second gate electrically connected to the second terminal. Each pixel further includes a first transistor electrically connected to a driving voltage line and the first terminal of the driving transistor, a second transistor electrically connected to the second terminal of the driving transistor and a light-emitting diode, a first capacitor electrically connected to the first gate of the driving transistor and the second terminal of the driving transistor, and a second capacitor electrically connected to the driving voltage line and the second terminal of the driving transistor. A timing at which a first gate signal is applied to a gate of the first transistor and a timing at which a second gate signal is applied to a gate of the second transistor are different from each other.

21 Claims, 13 Drawing Sheets

(52) U.S. Cl.
CPC ............... *G09G 2310/0202* (2013.01); *G09G 2320/0247* (2013.01)

(58) Field of Classification Search
CPC ..... G09G 2320/0247; G09G 2330/021; G09G 3/3266; G09G 2320/0233; G09G 2310/0262
See application file for complete search history.

(56) References Cited

U.S. PATENT DOCUMENTS

| | | | | |
|---|---|---|---|---|
| 2015/0187276 | A1 | 7/2015 | Shim et al. | |
| 2017/0124941 | A1* | 5/2017 | Na | G09G 3/2092 |
| 2019/0180688 | A1* | 6/2019 | Yang | G09G 3/3233 |
| 2020/0394961 | A1 | 12/2020 | Kim et al. | |
| 2021/0287605 | A1 | 9/2021 | Wang et al. | |
| 2021/0366397 | A1 | 11/2021 | Na | |
| 2022/0173189 | A1 | 6/2022 | Kim et al. | |
| 2022/0262303 | A1 | 8/2022 | Kim et al. | |
| 2022/0284860 | A1* | 9/2022 | Lin | G09G 3/3266 |
| 2022/0366852 | A1 | 11/2022 | Jeong et al. | |
| 2023/0260448 | A1* | 8/2023 | Lee | G09G 3/3233 345/55 |

FOREIGN PATENT DOCUMENTS

| | | |
|---|---|---|
| KR | 10-2020-0142646 | 12/2020 |
| KR | 10-2021-0013509 | 2/2021 |
| KR | 10-2021-0114578 | 9/2021 |
| KR | 10-2021-0143970 | 11/2021 |
| KR | 10-2022-0014366 | 2/2022 |
| KR | 10-2022-0076872 | 6/2022 |
| KR | 10-2486663 | 1/2023 |

* cited by examiner

DISPLAY APPARATUS

CROSS-REFERENCE TO RELATED APPLICATION(S)

This application claims priority to and benefits of Korean Patent Application No. 10-2023-0016993 under 35 U.S.C. § 119, filed on Feb. 8, 2023 in the Korean Intellectual Property Office, the entire contents of which are incorporated herein by reference.

BACKGROUND

1. Technical Field

Embodiments relate to pixels and a display apparatus including the same.

2. Description of the Related Art

Recently, display apparatuses have been used in a greater variety of ways. In addition, display apparatuses have become thinner and lighter in weight, and thus, their range of use has widened.

As display apparatuses are used in various ways, various methods may be used to design forms of display apparatuses, and the number of functions that may be connected or linked to display apparatuses has been increasing.

SUMMARY

Embodiments include a display apparatus with improved display quality. However, such a technical solution is an example, and embodiments are not limited thereto.

Additional aspects will be set forth in part in the description which follows and, in part, will be apparent from the description, or may be learned by practice of the embodiments of the disclosure.

According to an embodiment, a display apparatus may include a plurality of pixels, each of the plurality of pixels including a driving transistor including a first terminal, a second terminal, a first gate, and a second gate electrically connected to the second terminal. Each of the plurality of pixels may further include a first capacitor electrically connected to the first gate of the driving transistor and the second terminal of the driving transistor, a second capacitor electrically connected to a driving voltage line and the second terminal of the driving transistor, a first initialization transistor electrically connected to the second terminal of the driving transistor and a first initialization voltage line, and a second initialization transistor electrically connected to a light-emitting diode and a second initialization voltage line. One frame may include a first scan period including a first non-emission period and a first emission period, and a second scan period including a second non-emission period and a second emission period. A first gate signal may be applied to a gate of the first initialization transistor during the first non-emission period of the one frame, and a second gate signal may be applied to a gate of the second initialization transistor during each of the first non-emission period and the second non-emission period.

The first gate signal may be applied to the gate of the first initialization transistor only during the first non-emission period of the one frame.

Each of the plurality of pixels may further include a first transistor electrically connected to a data line and the first gate of the driving transistor, a second transistor electrically connected to a reference voltage line and the first gate of the driving transistor, a third transistor electrically connected to the driving voltage line and the first terminal of the driving transistor, and a fourth transistor electrically connected to the second terminal of the driving transistor and the light-emitting diode.

The first non-emission period may include a writing period during which a third gate signal is applied to a gate of the first transistor, and a first period before the writing period, during which the first gate signal is applied to the gate of the first initialization transistor, the second gate signal is applied to the gate of the second initialization transistor, and a fourth gate signal is applied to a gate of the second transistor. The second non-emission period may include a second period during which the second gate signal is applied to the gate of the second initialization transistor.

The first non-emission period may further include a third period between the writing period and the first period, during which the fourth gate signal is applied to the gate of the second transistor, and a fifth gate signal is applied to a gate of the third transistor.

The first non-emission period may further include a fourth period between the writing period and the first emission period, during which the first gate signal is applied to the gate of the first initialization transistor, and the second gate signal is applied to the gate of the second initialization transistor, and the second non-emission period may further include a fifth period between the second period and the second emission period, during which the second gate signal is applied to the gate of the second initialization transistor.

During the first emission period, a fifth gate signal may be applied to a gate of the third transistor, and a sixth gate signal may be applied to a gate of the fourth transistor, and a timing of application of the fifth gate signal and a timing of application of the sixth gate signal may be different from each other.

The timing of application of the fifth gate signal may precede the timing of application of the sixth gate signal.

A level of a second initialization voltage applied to the second initialization voltage line may be higher than a level of a first initialization voltage applied to the first initialization voltage line.

According to an embodiment, a display apparatus may include a plurality of pixels, each of the plurality of pixels including a driving transistor including a first terminal, a second terminal, a first gate, and a second gate electrically connected to the second terminal. Each of the plurality of pixels may further include a first transistor electrically connected to a driving voltage line and the first terminal of the driving transistor, a second transistor electrically connected to the second terminal of the driving transistor and a light-emitting diode, a first capacitor electrically connected to the first gate of the driving transistor and the second terminal of the driving transistor, and a second capacitor electrically connected to the driving voltage line and the second terminal of the driving transistor. A timing at which a first gate signal is applied to a gate of the first transistor and a timing at which a second gate signal is applied to a gate of the second transistor may be different from each other.

The timing of application of the first gate signal may precede the timing of application of the second gate signal.

Each of the plurality of pixels may further include a third transistor electrically connected to a data line and the first gate of the driving transistor, a fourth transistor electrically connected to a reference voltage line and the first gate of the driving transistor, a fifth transistor electrically connected to the second terminal of the driving transistor and a first initialization voltage line, and a sixth transistor electrically connected to the light-emitting diode and a second initialization voltage line.

One frame may include a first scan period including a first non-emission period, and a first emission period, and a second scan period including a second non-emission period and a second emission period. A third gate signal may be applied to a gate of the fifth transistor only during the first non-emission period of the one frame, and a fourth gate signal may be applied to a gate of the sixth transistor during each of the first non-emission period and the second non-emission period.

The first non-emission period may include a writing period during which a fifth gate signal is applied to a gate of the third transistor, and a first period before the writing period, during which the third gate signal is applied to the gate of the fifth transistor, the fourth gate signal is applied to the gate of the sixth transistor, and a sixth gate signal is applied to a gate of the fourth transistor. The second non-emission period may include a second period during which the fourth gate signal is applied to the gate of the sixth transistor.

The first non-emission period may further include a third period between the writing period and the first period, during which the first gate signal is applied to the gate of the first transistor, and the sixth gate signal is applied to the gate of the fourth transistor.

The first non-emission period may further include a fourth period between the writing period and the first emission period, during which the third gate signal is applied to the gate of the fifth transistor, and the fourth gate signal is applied to the gate of the sixth transistor, and the second non-emission period may further include a fifth period between the second period and the second emission period, during which the fourth gate signal is applied to the gate of the sixth transistor.

One frame may include a first scan period including a first non-emission period, and a first emission period, and a second scan period including a second non-emission period, and a second emission period During each of the first non-emission period and the second non-emission period of the one frame, a third gate signal may be applied to a gate of the fifth transistor and a gate of the sixth transistor, twice by a certain interval.

The first non-emission period may include a writing period during which a fourth gate signal is applied to a gate of the third transistor, and a first period before the writing period, during which the third gate signal is applied to the gate of the fifth transistor and the gate of the sixth transistor, and a sixth gate signal is applied to a gate of the fourth transistor. The second non-emission period may include a second period during which the third gate signal is applied to the gate of the fifth transistor and the gate of the sixth transistor.

The first non-emission period may further include a third period between the writing period and the first period, during which the first gate signal is applied to the gate of the first transistor, and a fifth gate signal is applied to a gate of the fourth transistor.

The first non-emission period may further include a fourth period between the writing period and the first emission period, during which the third gate signal is applied to the gate of the fifth transistor and the gate of the sixth transistor, and the second non-emission period may further include a fifth period between the second period and the second emission period, during which the third gate signal is applied to the gate of the fifth transistor and the gate of the sixth transistor.

A level of a first initialization voltage applied to the first initialization voltage line may be lower than a level of a second initialization voltage applied to the second initialization voltage line.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION OF THE EMBODIMENTS

Figure 1A:
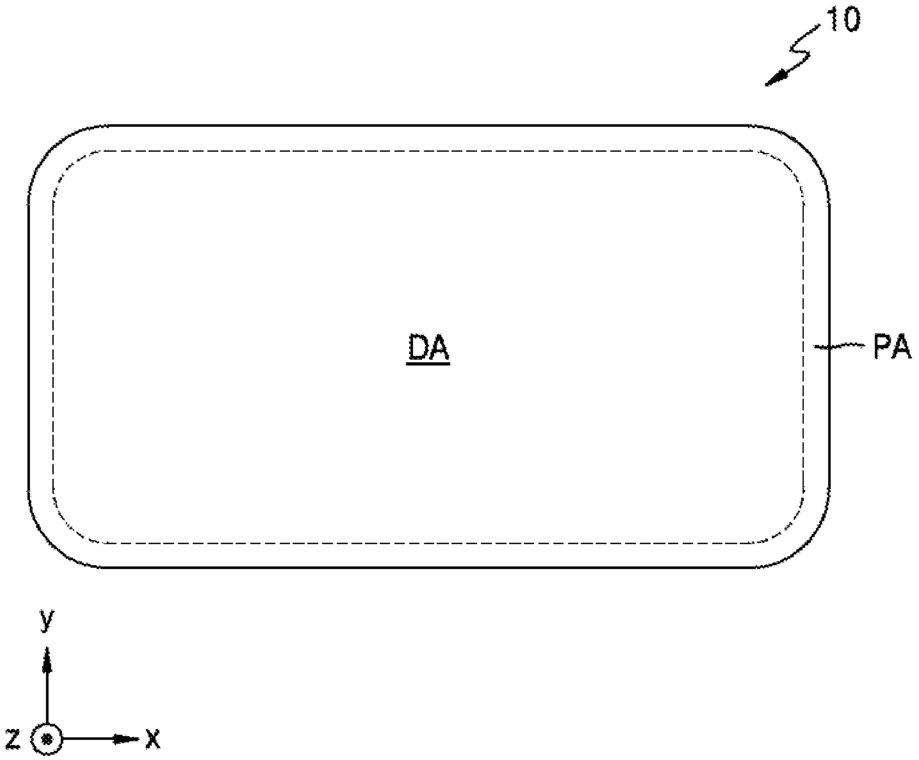
FIGS. 1A and 1B are schematic diagrams of a display apparatus according to an embodiment.

Reference will now be made in detail to embodiments, examples of which are illustrated in the accompanying drawings, wherein like reference numerals refer to like elements throughout. In this regard, the embodiments may have different forms and should not be construed as being limited to the descriptions set forth herein. Accordingly, the embodiments are merely described below, by referring to the figures, to explain aspects of the description.

As used herein, the term "and/or" includes any and all combinations of one or more of the associated listed items. For example, "A and/or B" may be understood to mean "A, B, or A and B." The terms "and" and "or" may be used in the conjunctive or disjunctive sense and may be understood to be equivalent to "and/or." In the specification and the claims, the phrase "at least one of" is intended to include the meaning of "at least one selected from the group of" for the purpose of its meaning and interpretation. For example, "at least one of A and B" may be understood to mean "A, B, or A and B."

While such terms as "first" and "second" may be used to describe various elements, such elements must not be limited to the above terms. The above terms are used only to distinguish one element from another.

The singular forms "a," "an," and "the" as used herein are intended to include the plural forms as well unless the context clearly indicates otherwise.

It will be understood that the terms "include," "comprise," and "have" as used herein specify the presence of stated features or elements but do not preclude the addition of one or more other features or elements.

It will be further understood that, when a layer, region, or element is referred to as being on another layer, region, or element, it may be directly or indirectly on the other layer, region, or element. For example, intervening layers, regions, or elements may be present.

Sizes of elements in the drawings may be exaggerated or reduced for convenience of explanation. For example, since sizes and thicknesses of elements in the drawings may be arbitrarily illustrated for convenience of explanation, the following embodiments are not limited thereto.

It will be understood that the terms "connected to" or "coupled to" may include a physical and/or electrical connection or coupling.

It will be understood that when an element (or a region, a layer, a portion, or the like) is referred to as "being on", "connected to" or "coupled to" another element in the specification, it can be directly disposed on, connected or coupled to another element mentioned above, or intervening elements may be disposed therebetween.

The case where X and Y are electrically connected may include, for example, the case where at least one device (e.g., a switch, a transistor, a capacitance element, an inductor, a resistance element, a diode, etc.) that enables electrical connection of X and Y is connected between X and Y or the case where X and Y are directly electrically connected.

As used herein, "ON" used in association with an element state may denote an activated state of an element, and "OFF" may denote an inactivated state of an element. "ON" used in association with a signal received by an element may denote a signal activating the element, and "OFF" may denote a signal inactivating the element. An element may be activated by a high-level voltage or a low-level voltage. For example, a P-channel transistor (a P-type transistor) may be activated by a low-level voltage, and an N-channel transistor (an N-type transistor) may be activated by a high-level voltage. Therefore, it should be understood that "ON" voltages for a P-type transistor and an N-type transistor may be opposite (low versus high) voltage levels.

The direction x, the direction y, and the direction z are not limited to directions along three axes of the rectangular coordinate system and may be interpreted in a broader sense. For example, the direction x, the direction y, and the direction z may be perpendicular to one another or may represent different directions that are not perpendicular to one another.

"About" or "approximately" or "substantially" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" may mean within one or more standard deviations, or within ±30%, 20%, 10%, 5% of the stated value.

Unless otherwise defined or implied herein, all terms (including technical and scientific terms) used herein have the same meaning as commonly understood by one of ordinary skill in the art to which the disclosure pertains. It will be further understood that terms, such as those defined in commonly used dictionaries, should be interpreted as having a meaning that is consistent with their meaning in the context of the relevant art and the disclosure and will not be interpreted in an idealized or overly formal sense unless expressly so defined herein.

A display apparatus according to an embodiment may be implemented as an electronic device, such as a smartphone, a mobile phone, a smartwatch, a navigation device, a game console, a television (TV), an automotive head unit, a notebook computer, a laptop computer, a tablet computer, a personal media player (PMP), a personal digital assistant (PDA), etc. The electronic device may be a flexible device.

Figure 1B:
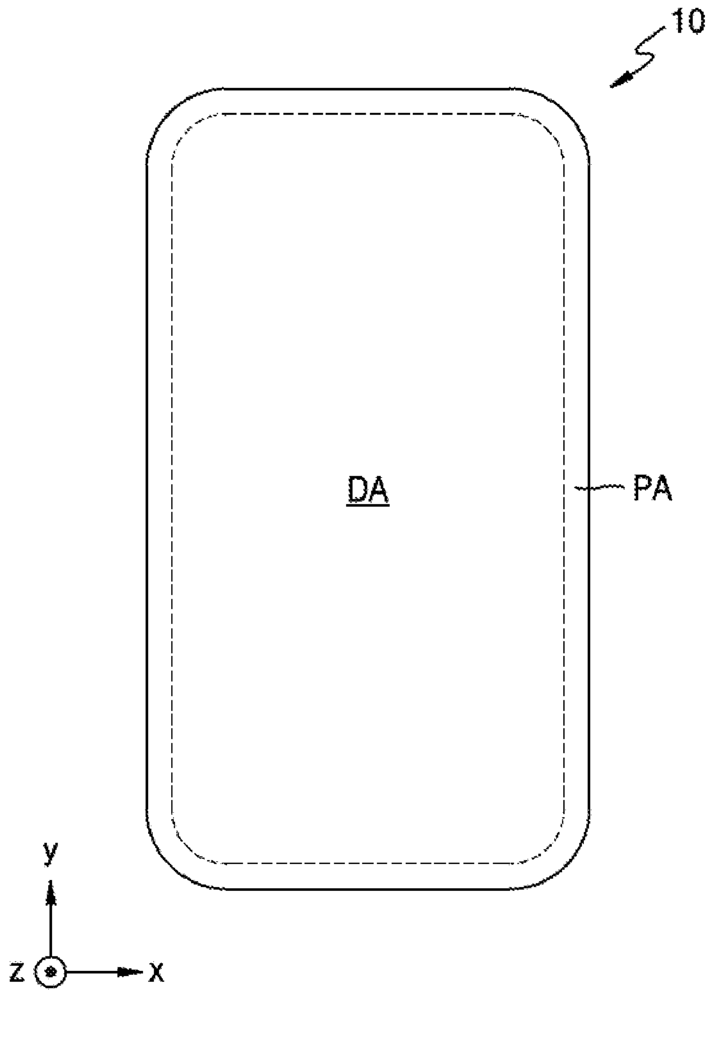
Figure 2:
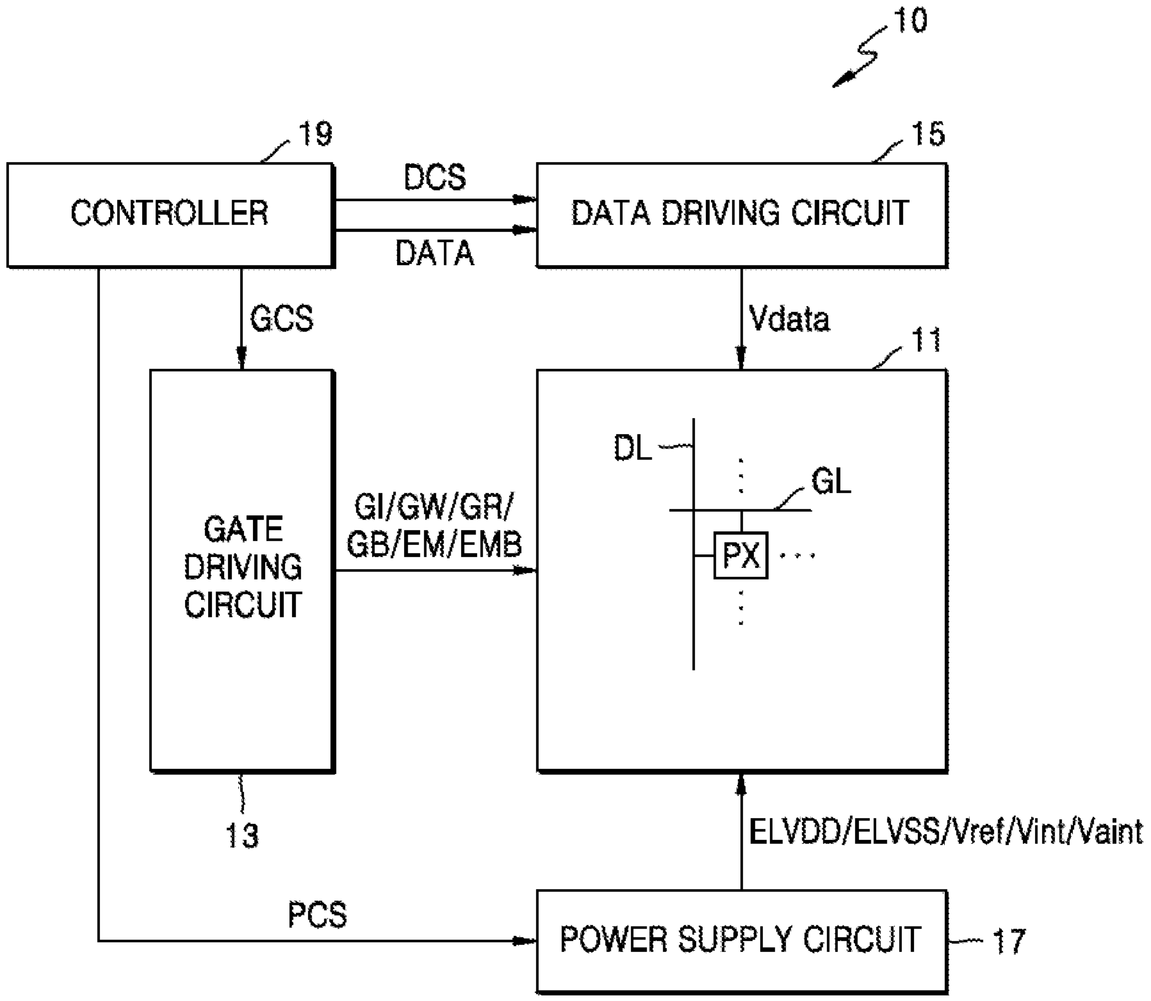
FIG. 2 is a schematic diagram of a display apparatus according to an embodiment.
Figure 3A:
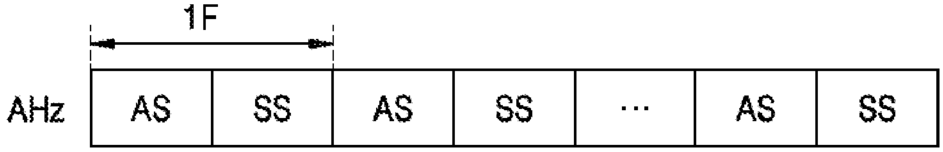
FIGS. 3A and 3B are schematic diagrams of a method of driving a display apparatus according to a driving frequency.
Figure 3B:
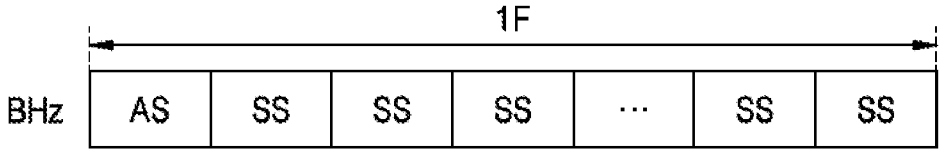

FIGS. 1A and 1B are schematic diagrams of a display apparatus 10 according to an embodiment. FIG. 2 is a schematic diagram of the display apparatus 10 according to an embodiment. FIGS. 3A and 3B are schematic diagrams of a method of driving a display apparatus according to a driving frequency.

Referring to FIGS. 1A and 1B, the display apparatus 10 may include a display area DA displaying an image and a peripheral area PA outside the display area DA. The display area DA may be entirely surrounded by the peripheral area PA.

In a plan view of the display area DA, the display area DA may have a rectangular shape. In another embodiment, the display area DA may have a polygonal shape, such as a triangle, a pentagon, or a hexagon, a circular shape, an oval shape, or an atypical shape. The edge of the display area DA may have round corners. In an embodiment, the display apparatus 10 may have the display area DA in which a length in the direction x is greater than a length in the direction y as shown in FIG. 1A. In another embodiment, the display apparatus 10 may have the display area DA in which a length in the direction y is greater than a length in the direction x as shown in FIG. 1B.

Referring to FIG. 2, the display apparatus 10 according to an embodiment may include a pixel portion 11, a gate driving circuit 13, a data driving circuit 15, a power supply circuit 17, and a controller 19.

The pixel portion 11 may be provided in the display area DA. Various conductive lines configured to transmit electric signals to be applied to the display area DA, outer circuits electrically connected to pixel circuits, and pads on which a printed circuit board or a driver integrated circuit (IC) chip is attached may be located in the peripheral area PA. For example, the gate driving circuit 13, the data driving circuit 15, the power supply circuit 17, and the controller 19 may be provided in the peripheral area PA.

As shown in FIG. 2, gate lines GL, data lines DL, and pixels PX connected thereto may be arranged in the display area DA. The pixels PX may be arranged in various forms, such as a stripe arrangement, a PenTile™ arrangement (e.g., a diamond arrangement) and/or a mosaic arrangement, to display an image. Each pixel PX may include an organic light-emitting diode OLED, which is a display element (a light-emitting element), and the organic light-emitting diode OLED may be connected to a pixel circuit. The pixel circuit may include transistors and at least one capacitor. The pixel PX may emit, for example, red, green, blue, or white light, through the organic light-emitting diode OLED. Each pixel PX may be connected to at least one corresponding gate line among the gate lines GL and at least one corresponding data line among the data lines DL.

Each of the gate lines GL may extend in the direction x (a row direction) and be connected to pixels PX located in the same row. Each of the gate lines GL may be configured to transmit a gate signal to the pixels PX in the same row. Each of the data lines DL may extend in the direction y (a column direction) and be connected to pixels PX located in the same column. Each of the data lines DL may be configured to transmit a data signal to each of the pixels PX in the same column in synchronization with the gate signal.

In an embodiment, the peripheral area PA may be a non-display area in which pixels PX are not arranged. In another embodiment, a portion of the peripheral area PA may be implemented as the display area DA. For example, the pixels PX may be arranged in at least one corner of the peripheral area PA to overlap the gate driving circuit 13. Accordingly, dead space (e.g., unutilized space) may be reduced, and the display area DA may be expanded.

The gate driving circuit 13 may be connected to the gate lines GL and may be configured to generate gate signals in response to a control signal GCS from the controller 19 and sequentially supply the gate signals to the gate lines GL. The gate line GL may be connected to a gate of a transistor included in the pixel PX. The gate signal may be a gate control signal for controlling turn-on and turn-off of a transistor having a gate connected to the gate line GL. The gate signal may be a square wave signal including an on voltage at which the transistor may be turned on and an off voltage at which the transistor may be turned off. In an embodiment, the on voltage may be a high-level voltage (a first level voltage) or a low-level voltage (a second level voltage).

Although the pixel PX is shown in FIG. 2 as being connected to one gate line GL, this is an example, and the pixel PX may be connected to two or more gate lines, and the gate driving circuit 13 may be configured to supply two or more gate signals whose timings at which on voltages are applied are different from each other to the corresponding gate lines. For example, the pixel PX may be connected to first to sixth gate lines, and the gate driving circuit 13 may be configured to apply a first gate signal GW, a second gate signal GI, a third gate signal GR, a fourth gate signal GB, a fifth gate signal EM, and a sixth gate signal EMB to first gate lines, second gate lines, third gate lines, fourth gate lines, fifth gate lines, and sixth gate lines, respectively.

The data driving circuit 15 may be connected to the data lines DL and may be configured to supply data signals to the data lines DL in response to a control signal DCS from the controller 19. The data signal supplied to the data line DL may be supplied to the pixel PX to which the gate signal is supplied. The data driving circuit 15 may be configured to convert input image data DATA having a gray scale input from the controller 19 into a data signal in the form of voltage or current. FIG. 2 shows an example in which the data driving circuit 15 is configured to output a data signal Vdata in the form of voltage.

The power supply circuit 17 may be configured to generate voltages required to drive the pixel PX, in response to a control signal PCS from the controller 19. The power supply circuit 17 may be configured to generate a first driving voltage ELVDD and a second driving voltage ELVSS and supply the same to the pixels PX. The first driving voltage ELVDD may be a high-level voltage provided to a first electrode (a pixel electrode or an anode) of a display element included in the pixel PX. The second driving voltage ELVSS may be a low-level voltage provided to a second electrode (an opposite electrode or a cathode) of a display element included in the pixel PX. The power supply circuit 17 may be configured to generate a reference voltage Vref, a first initialization voltage Vint, and a second initialization voltage Vaint and supply the same to the pixels PX.

A voltage level of the first driving voltage ELVDD may be higher than a voltage level of the second driving voltage ELVSS. A voltage level of the reference voltage Vref may be lower than the voltage level of the first driving voltage ELVDD. A voltage level of the first initialization voltage Vint may be lower than the voltage level of the second driving voltage ELVSS. A voltage level of the second initialization voltage Vaint may be higher than the voltage level of the first initialization voltage Vint. The voltage level of the second initialization voltage Vaint may be the same as or higher than the voltage level of the second driving voltage ELVSS.

The controller 19 may generate the control signals GCS, DCS, and PCS, based on signals input from the outside, and may supply the same to the gate driving circuit 13, the data driving circuit 15, and the power supply circuit 17. The control signal GCS output to the gate driving circuit 13 may include clock signals and a gate start signal. The control signal DCS output to the data driving circuit 15 may include a source start signal and clock signals.

The display apparatus 10 may include a display panel, and the display panel may include a substrate. The pixels PX may be arranged in the display area DA of the substrate. A portion of the gate driving circuit 13 or the entire gate driving circuit 13 may be directly formed in the peripheral area PA of the substrate during a process of forming a transistor constituting the pixel circuit in the display area DA of the substrate. The data driving circuit 15, the power supply circuit 17, and the controller 19 may each be formed in the form of an individual IC chip or be formed in the form of a single IC chip, and may be disposed on a flexible printed circuit board (FPCB) electrically connected to a pad arranged at one side of the substrate. In another embodiment, the data driving circuit 15, the power supply circuit 17, and the controller 19 may be directly disposed on the substrate in a chip-on-glass (COG) or chip-on-plastic (COP) manner.

In an embodiment, the transistors included in the pixel circuit may be N-type oxide thin-film transistors. In another embodiment, the transistors included in the pixel circuit may be P-type silicon thin-film transistors. In another embodiment, some of the transistors included in the pixel circuit may be N-type oxide thin-film transistors, and others may be P-type silicon thin-film transistors.

The oxide thin-film transistors may be low-temperature polycrystalline oxide (LTPO) thin-film transistors in which an active pattern (a semiconductor layer) includes oxide. However, this is an example, and the N-type transistors are not limited thereto. For example, an active pattern (a semiconductor layer) included in the N-type transistor may include an inorganic semiconductor (e.g., amorphous silicon, polysilicon) or an organic semiconductor. The silicon thin-film transistors may be low-temperature polycrystalline silicon (LTPS) thin-film transistors in which an active pattern (a semiconductor layer) includes amorphous silicon, polysilicon, etc.

The display apparatus 10 may support a variable refresh rate (VRR). A refresh rate, which is a frequency at which data signals are substantially written to a driving transistor of the pixel PX, is also called a screen scan rate or a screen refresh rate and may indicate the number of image frames reproduced for one second. In an embodiment, the refresh rate may be an output frequency of the gate driving circuit 13 and/or the data driving circuit 15. A frequency corresponding to the refresh rate may be a driving frequency. The display apparatus 10 may adjust an output frequency of the gate driving circuit 13 and a corresponding output frequency of the data driving circuit 15 according to the driving frequency. The display apparatus 10 supporting a VRR may operate by changing a driving frequency within the range between a maximum driving frequency and a minimum driving frequency. For example, in case that the refresh rate is about 60 Hz, gate signals for writing data signals may be supplied to each horizontal line (row) from the gate driving circuit 13 about 60 times per second. The display apparatus 10 may display an image while changing a driving frequency according to a refresh rate.

Depending on the driving frequency, one frame 1F may include a first scan period AS and one or more second scan periods SS. For example, as shown in FIG. 3A, in the display apparatus 10 operating at a driving frequency of A Hz, one frame 1F may include one first scan period AS and one second scan period SS. As shown in FIG. 3B, in the display apparatus 10 operating at a driving frequency of B Hz lower than the driving frequency of A Hz, one frame 1F may include one first scan period AS and two or more second scan periods SS. As the driving frequency is lowered, one frame 1F may be longer. In another embodiment, one frame 1F may include only one first scan period AS.

A first scan period AS may be defined as an address scan period during which a data signal is written to the pixel PX in response to the first gate signal GW and the pixel PX emits light accordingly. An operation of writing a data signal from the data line DL to the pixel PX may also be referred to as a data programming operation. A second scan period SS may be defined as a self scan period during which the first gate signal GW is not applied to the pixel PX and no data signal is written. During the second scan period SS, the data signal written during the first scan period AS may be maintained and the pixel PX may emit light. A length of the second scan period SS may be the same as that of the first scan period AS.

Figure 4:
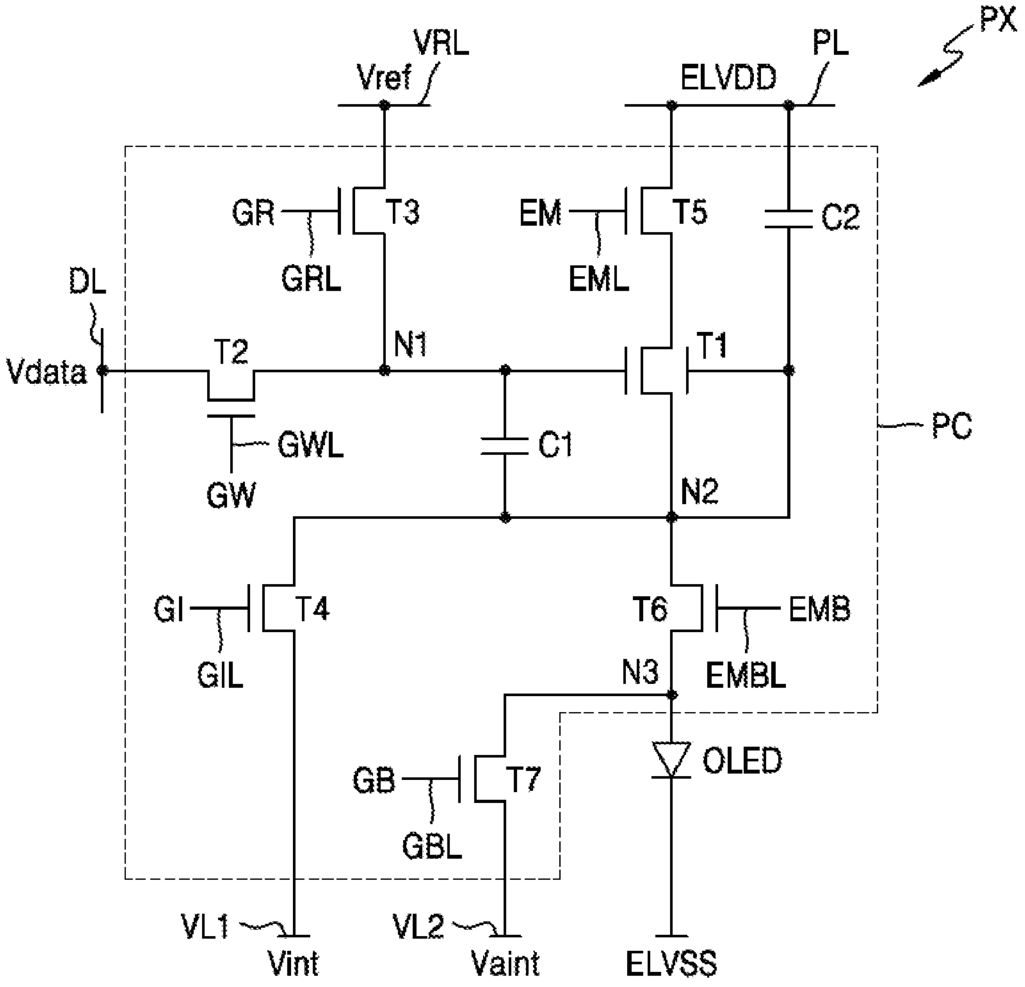
FIG. 4 is a schematic diagram of an equivalent circuit of a pixel according to an embodiment.
Figure 5:
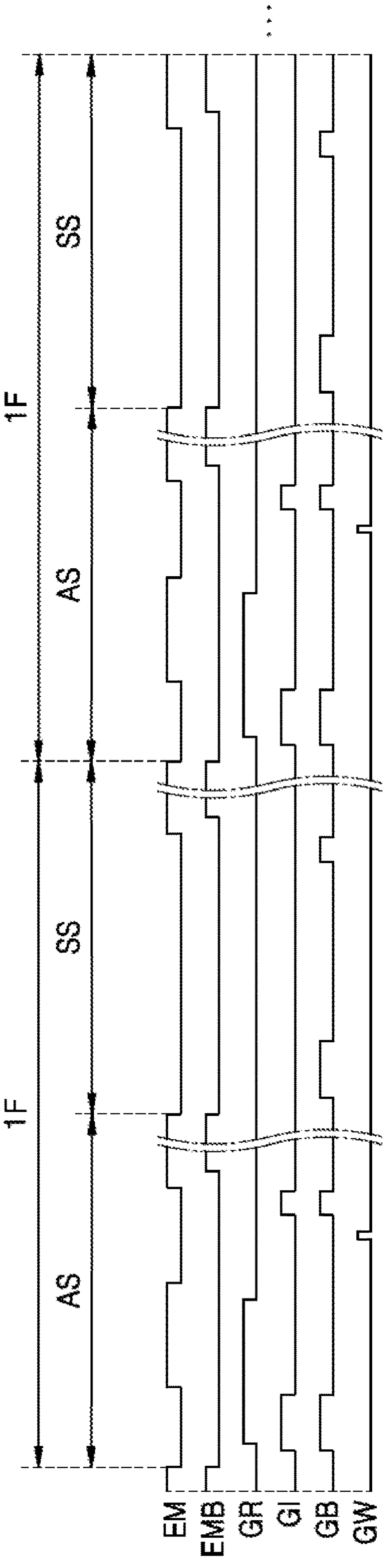
FIGS. 5 to 7 are diagrams schematically showing the signals for describing operations of the pixel shown in FIG. 4.
Figure 6:
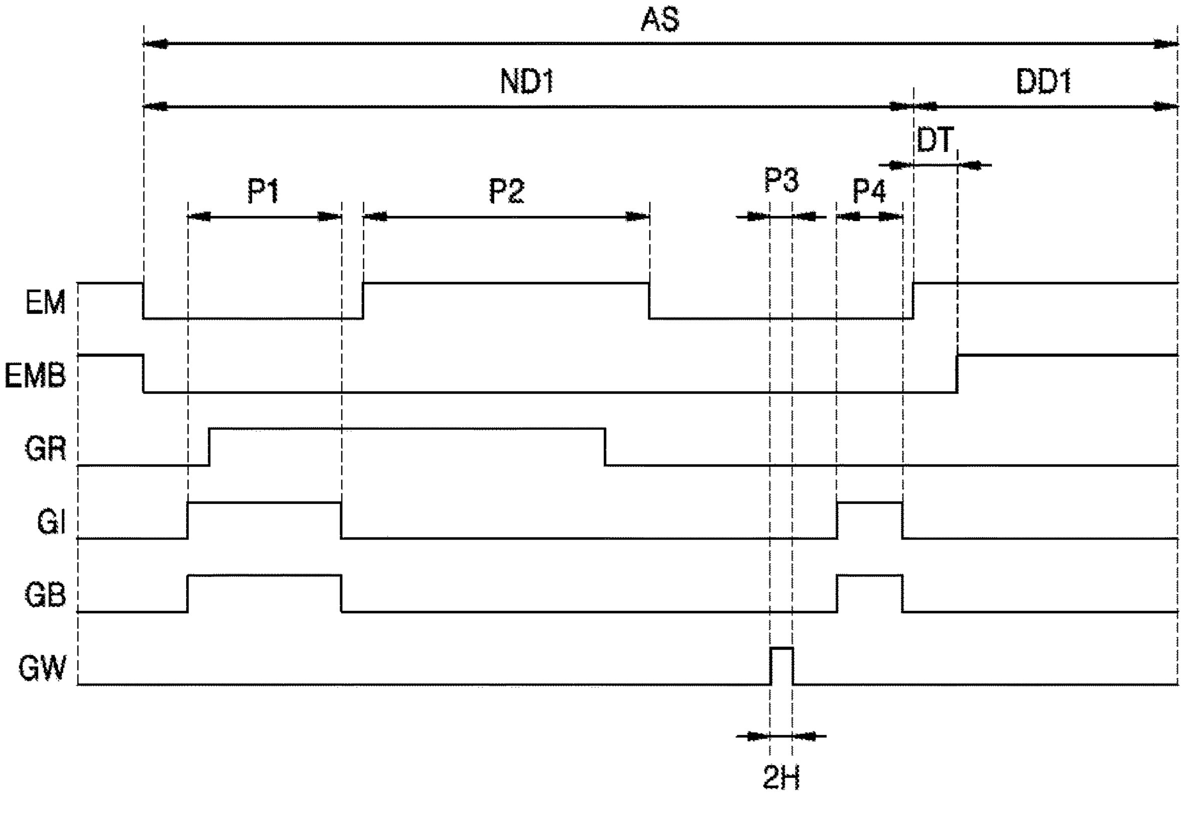
Figure 7:
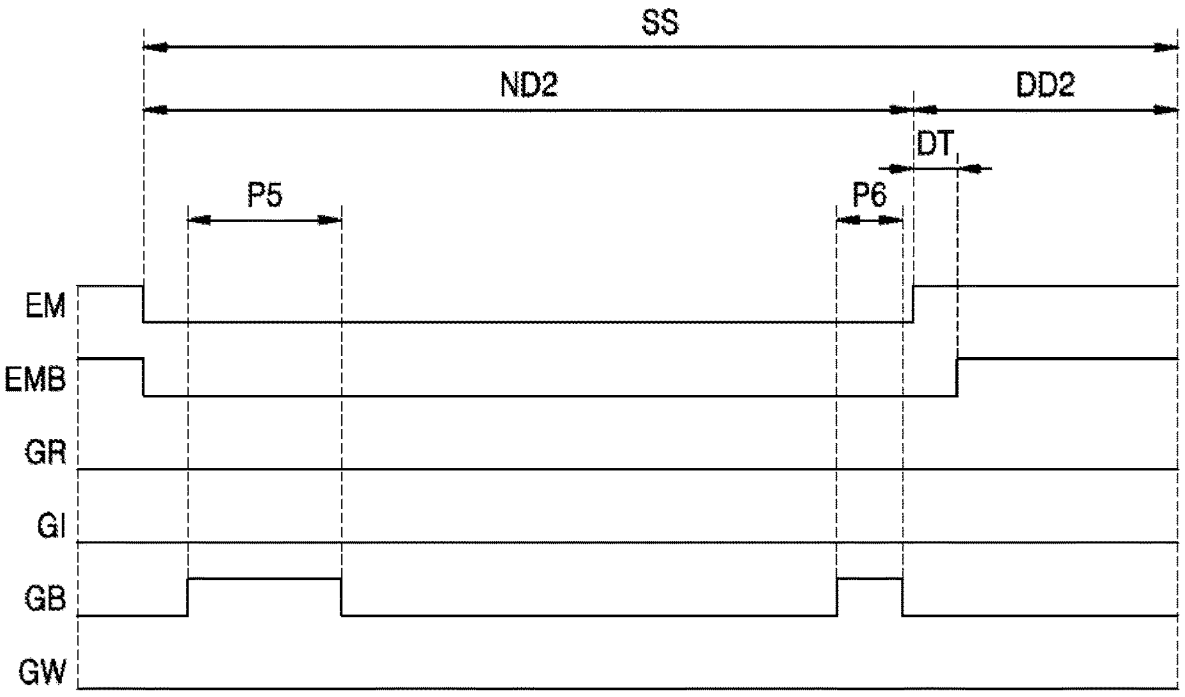

FIG. 4 is a schematic diagram of an equivalent circuit of the pixel PX according to an embodiment. FIGS. 5 to 7 are diagrams schematically showing the signals for describing operations of the pixel PX shown in FIG. 4.

Referring to FIG. 4, the pixel PX may include an organic light-emitting diode OLED, which is a display element, and a pixel circuit PC connected to the organic light-emitting diode OLED. The pixel circuit PC may include first to seventh transistors T1 to T7 and first and second capacitors C1 and C2. The first transistor T1 may be a driving transistor configured to output a driving current corresponding to a data signal, and the second to seventh transistors T2 to T7 may be switching transistors configured to transmit a signal. A first terminal (a first electrode) and a second terminal (a second electrode) of each of the first to seventh transistors T1 to T7 may be source or drain depending on voltages of the first terminal and the second terminal. For example, depending on voltages of the first terminal and the second terminal, the first terminal may be drain and the second terminal may be source, or the first terminal may be source and the second terminal may be drain. A node to which a first gate of the first transistor T1 is connected may be defined as a first node N1, and a node to which a second terminal of the first transistor T1 is connected may be defined as a second node N2.

The pixel PX may be connected to a first gate line GWL configured to transmit the first gate signal GW, a second gate line GIL configured to transmit the second gate signal GI, a third gate line GRL configured to transmit the third gate signal GR, a fourth gate line GBL configured to transmit the fourth gate signal GB, a fifth gate line EML configured to transmit the fifth gate signal EM, a sixth gate line EMBL configured to transmit the sixth gate signal EMB, and the data line DL configured to transmit the data signal Vdata. Because light emission of the pixel PX may be controlled by the fifth gate signal EM and the sixth gate signal EMB, the fifth gate signal EM and the sixth gate signal EMB may be referred to as emission control signals, and the fifth gate line EML and the sixth gate line EMBL may be referred to as emission control lines.

The pixel PX may be connected to a driving voltage line PL configured to transfer the first driving voltage ELVDD, a reference voltage line VRL configured to transfer the reference voltage Vref, a first initialization voltage line VL1 configured to transfer the first initialization voltage Vint, and a second initialization voltage line VL2 configured to transfer the second initialization voltage Vaint.

The first transistor T1 may be connected between the driving voltage line PL and the second node N2. The first transistor T1 may include a gate, a first terminal, and a second terminal connected to the second node N2. The gate of the first transistor T1 may include a first gate connected to the first node N1 and a second gate connected to the second node N2. The first gate and the second gate may be disposed on different layers to face each other. For example, the first gate and the second gate of the first transistor T1 may face each other with a semiconductor layer therebetween.

The first gate of the first transistor T1 may be connected to a second terminal of the second transistor T2, a second terminal of the third transistor T3, and a first capacitor C1. The second gate of the first transistor T1 may be connected to a first terminal of the sixth transistor T6, the first capacitor C1, and a second capacitor C2. The first terminal of the first transistor T1 may be connected to the driving voltage line PL via the fifth transistor T5, and the second terminal of the first transistor T1 may be connected to a pixel electrode of the organic light-emitting diode OLED via the sixth transistor T6. The second terminal of the first transistor T1 may be connected to a first terminal of the fourth transistor T4, the first terminal of the sixth transistor T6, the first capacitor C1, and the second capacitor C2. The first transistor T1 may be configured to receive the data signal Vdata according to a switching operation of the second transistor T2 and control an amount of driving current flowing to the organic light-emitting diode OLED.

The second transistor T2 (a data writing transistor) may be connected between the data line DL and the first gate of the first transistor T1. The second transistor T2 may include a gate connected to the first gate line GWL, a first terminal connected to the data line DL, and a second terminal connected to the first node N1. The second terminal of the second transistor T2 may be connected to the first gate of the first transistor T1, the second terminal of the third transistor T3, and the first capacitor C1. The second transistor T2 may be turned on by the first gate signal GW transmitted through the first gate line GWL to electrically connect the data line DL and the first node N1 to each other and transmit the data signal Vdata transmitted through the data line DL to the first node N1.

The third transistor T3 (a first initialization transistor) may be connected between the first gate of the first transistor T1 and the reference voltage line VRL. The third transistor T3 may include a gate connected to the third gate line GRL, a first terminal connected to the first node N1, and a second terminal connected to the reference voltage line VRL. The second terminal of the third transistor T3 may be connected to the first gate of the first transistor T1, the second terminal of the second transistor T2, and the first capacitor C1. The third transistor T3 may be turned on by the third gate signal GR transmitted through the third gate line GRL to transfer the reference voltage Vref transferred through the reference voltage line VRL to the first node N1.

The fourth transistor T4 (a second initialization transistor) may be connected between the first transistor T1 and the first initialization voltage line VL1. The fourth transistor T4 may include a gate connected to the second gate line GIL, a first terminal connected to the second node N2, and a second terminal connected to the first initialization voltage line VL1. The first terminal of the fourth transistor T4 may be connected to the second terminal of the first transistor T1, the first terminal of the sixth transistor T6, the first capacitor C1, and the second capacitor C2. The fourth transistor T4 may be turned on by the second gate signal GI transmitted through the second gate line GIL to transfer the first initialization voltage Vint transferred through the first initialization voltage line VL1 to the second node N2.

The fifth transistor T5 (a first emission control transistor) may be connected between the driving voltage line PL and the first transistor T1. The fifth transistor T5 may include a gate connected to the fifth gate line EML, a first terminal connected to the driving voltage line PL, and a second terminal connected to the first terminal of the first transistor T1. The fifth transistor T5 may be turned on or turned off according to the fifth gate signal EM transmitted through the fifth gate line EML.

The sixth transistor T6 (a second emission control transistor) may be connected between the first transistor T1 and the organic light-emitting diode OLED. The sixth transistor T6 may be connected between the second node N2 and a third node N3. The sixth transistor T6 may include a gate connected to the sixth gate line EMBL, a first terminal connected to the second node N2, and a second terminal connected to the third node N3. The first terminal of the sixth transistor T6 may be connected to the second terminal of the first transistor T1, the first terminal of the fourth transistor T4, the first capacitor C1, and the second capacitor C2. The second terminal of the sixth transistor T6 may be connected to a first terminal of the seventh transistor T7 and the pixel electrode of the organic light-emitting diode OLED. The sixth transistor T6 may be turned on or turned off according to the sixth gate signal EMB transmitted through the sixth gate line EMBL.

The seventh transistor T7 (a third initialization transistor) may be connected between the organic light-emitting diode OLED and the second initialization voltage line VL2. The seventh transistor T7 may be connected between the sixth transistor T6 and the second initialization voltage line VL2. The seventh transistor T7 may include a gate connected to the fourth gate line GBL, a first terminal connected to the third node N3, and a second terminal connected to the second initialization voltage line VL2. The first terminal of the seventh transistor T7 may be connected to the second terminal of the sixth transistor T6 and the pixel electrode of the organic light-emitting diode OLED. The seventh transistor T7 may be turned on by the fourth gate signal GB transmitted through the fourth gate line GBL to transfer the second initialization voltage Vaint transferred through the second initialization voltage line VL2 to the third node N3.

The first capacitor C1 may be connected between the first gate of the first transistor T1 and the second terminal of the first transistor T1. A first electrode of the first capacitor C1 may be connected to the first node N1, and a second electrode of the first capacitor C1 may be connected to the second node N2. The first electrode of the first capacitor C1 may be connected to the first gate of the first transistor T1, the second terminal of the second transistor T2, and the second terminal of the third transistor T3. The second electrode of the first capacitor C1 may be connected to the second terminal and the second gate of the first transistor T1, a second electrode of the second capacitor C2, the first terminal of the fourth transistor T4, and the first terminal of the sixth transistor T6. The first capacitor C1 may be a storage capacitor and may store voltages corresponding to a threshold voltage of the first transistor T1 and the data signal Vdata.

The second capacitor C2 may be connected between the driving voltage line PL and the second node N2. A first electrode of the second capacitor C2 may be connected to the driving voltage line PL. The second electrode of the second capacitor C2 may be connected to the second terminal and the second gate of the first transistor T1, the second electrode of the first capacitor C1, the first terminal of the fourth transistor T4, and the first terminal of the sixth transistor T6. A capacitance of the first capacitor C1 may be greater than a capacitance of the second capacitor C2.

The organic light-emitting diode OLED may be connected to the first transistor T1 through the sixth transistor T6. The organic light-emitting diode OLED may include a pixel electrode (an anode) connected to the third node N3 and an opposite electrode (a cathode) facing the pixel electrode, and the opposite electrode may receive the second driving voltage ELVSS. The opposite electrode may be a common electrode common to multiple pixels PX.

In an embodiment, as shown in FIG. 5, the pixel PX may be driven in one first scan period AS and one second scan period SS during one frame 1F. Voltage levels of the first gate signal GW, the second gate signal GI, the third gate signal GR, the fourth gate signal GB, the fifth gate signal EM, and the sixth gate signal EMB applied to the pixel PX during the first scan period AS and the second scan period SS may be different from one another.

As shown in FIG. 6, the first scan period AS may include a first non-emission period ND1 during which the pixel PX does not emit light and a first emission period DD1 during which the pixel PX emits light. The first non-emission period ND1 may include a first period P1, a second period P2, a third period P3, and a fourth period P4.

Each of the first gate signal GW, the second gate signal GI, the third gate signal GR, the fourth gate signal GB, the fifth gate signal EM, and the sixth gate signal EMB may have a high-level voltage (a first level voltage) during some periods and may have a low-level voltage (a second level voltage) during some periods. In this regard, the high-level voltage may be an on voltage for turning on a transistor, and the low-level voltage may be an off voltage for turning off a transistor.

The first period P1 may be a first initialization period for initializing the first node N1 to which the first gate of the first transistor T1 is connected and the third node N3 to which the pixel electrode of the organic light-emitting diode OLED is connected. During the first period P1, the second gate signal GI of an on voltage may be supplied (applied) to the second gate line GIL, and the fourth gate signal GB of an on voltage may be supplied to the fourth gate line GBL. The third gate signal GR of an on voltage may be supplied to the third gate line GRL. The first gate signal GW, the fifth gate signal EM, and the sixth gate signal EMB may be supplied as off voltages. An on-voltage application timing of the third gate signal GR may be delayed by a certain time from on-voltage application timings of the second gate signal GI and the fourth gate signal GB.

The fourth transistor T4 may be turned on by the second gate signal GI, and the third transistor T3 may be turned on by the third gate signal GR. The second node N2, that is, the second terminal of the first transistor T1, may be initialized to the first initialization voltage Vint by the turned-on fourth transistor T4. The first node N1, that is, the first gate of the first transistor T1, may be initialized to the reference voltage Vref by the turned-on third transistor T3. The seventh transistor T7 may be turned on by the fourth gate signal GB, and the third node N3, that is, the pixel electrode of the organic light-emitting diode OLED, may be initialized to the second initialization voltage Vaint by the turned-on seventh transistor T7. The first capacitor C1 and the second capacitor C2 may be initialized by the turned-on third and fourth transistors T3 and T4.

The second period P2 may be a compensation period for compensating for a threshold voltage of the first transistor T1. During the second period P2, the third gate signal GR of an on voltage may be supplied to the third gate line GRL, and the fifth gate signal EM may be supplied to the fifth gate line EML. The first gate signal GW, the second gate signal GI, the fourth gate signal GB, and the sixth gate signal EMB may be supplied as off voltages.

The third transistor T3 may be turned on by the third gate signal GR, and the fifth transistor T5 may be turned on by the fifth gate signal EM. Accordingly, the reference voltage Vref may be supplied to the first node N1, and the first driving voltage ELVDD may be supplied to the first terminal of the first transistor T1, and thus, the first transistor T1 may be turned on. In case that a voltage of the second terminal of the first transistor T1 drops below a difference Vref-Vth between the reference voltage Vref and a threshold voltage Vth of the first transistor T1, the first transistor T1 may be turned off. A voltage corresponding to the threshold voltage Vth of the first transistor T1 may be stored in the first capacitor C1 to compensate for the threshold voltage Vth of the first transistor T1.

The third period P3 may be a writing period for supplying a data signal to a pixel. During the third period P3, the first gate signal GW of an on voltage may be supplied to the first gate line GWL. In an embodiment, the on voltage of the first gate signal GW may have a width of approximately 2 horizontal periods 2H. The second gate signal GI, the third gate signal GR, the fourth gate signal GB, the fifth gate signal EM, and the sixth gate signal EMB may be supplied as off voltages.

The second transistor T2 may be turned on by the first gate signal GW, and the turned-on second transistor T2 may be configured to transmit the data signal Vdata from the data line DL to the first node N1, that is, the first gate of the first transistor T1. Accordingly, a voltage of the first node N1 may be changed from the reference voltage Vref to a voltage corresponding to the data signal Vdata. In this regard, a voltage of the second node N2 may also be changed in response to an amount of change in the voltage of the first node N1. The voltage of the second node N2 may be a voltage $Vref-Vth+\alpha\times(Vdata-Vref)$ changed according to a capacitance ratio $(\alpha=C1/(C1+C2))$ of the first capacitor C1 and the second capacitor C2. Accordingly, the first capacitor C1 may be charged with a voltage corresponding to the threshold voltage Vth of the first transistor T1 and the data signal Vdata.

The fourth period P4 may be a second initialization period for initializing the second node N2 to which the second terminal of the first transistor T1 is connected and the third node N3 to which the pixel electrode of the organic light-emitting diode OLED is connected prior to the first emission period DD1. During the fourth period P4, the second gate signal GI of an on voltage may be supplied (applied) to the second gate line GIL, and the fourth gate signal GB of an on voltage may be supplied to the fourth gate line GBL. The first gate signal GW, the third gate signal GR, the fifth gate signal EM, and the sixth gate signal EMB may be supplied as off voltages.

The fourth transistor T4 may be turned on by the second gate signal GI, and the first initialization voltage Vint may be transferred to the second terminal of the first transistor T1 by the turned-on fourth transistor T4. The seventh transistor T7 may be turned on by the fourth gate signal GB, and the second initialization voltage Vaint may be transferred to the pixel electrode of the organic light-emitting diode OLED by the turned-on seventh transistor T7.

In case that low gradation (e.g., about 11 to about 31 gray scales) is displayed, a luminance change may occur due to a voltage remaining in the organic light-emitting diode OLED. By initializing the third node N3 during the fourth period P4 after data writing and before pixel light-emission, a change in luminance of the organic light-emitting diode OLED may be minimized in case that low gradation is displayed, and thus, image quality may be further improved. By using a voltage different from the first initialization voltage Vint, for example, a voltage higher than the first initialization voltage Vint, as the second initialization voltage Vaint, a voltage change time of the pixel electrode may be minimized, and thus, a screen flicker phenomenon may be minimized.

The first emission period DD1 may be a period during which the organic light-emitting diode OLED emits light. During the first emission period DD1, the fifth gate signal EM of an on voltage may be supplied to the fifth gate line EML, and the sixth gate signal EMB of an on voltage may be supplied to the sixth gate line EMBL. The first gate signal GW, the second gate signal GI, the third gate signal GR, and the fourth gate signal GB may be off voltages.

During the first emission period DD1, the fifth transistor T5 may be turned on by the fifth gate signal EM, and the first driving voltage ELVDD may be supplied to the first terminal of the first transistor T1 by the turned-on fifth transistor T5. The sixth transistor T6 may be turned on by the sixth gate signal EMB, and the first transistor T1 may be configured to output a driving current Id $(\propto(Vgs-Vth)^2)$ having the magnitude corresponding to a voltage $Vgs-Vth$ obtained by subtracting the threshold voltage Vth of the first transistor T1 from a voltage corresponding to the data signal Vdata stored in the first capacitor C1, that is, a gate-source voltage Vgs of the first transistor T1, and the organic light-emitting diode OLED may emit light at brightness corresponding to the magnitude of driving current regardless of the threshold voltage Vth of the first transistor T1.

As shown in FIG. 7, the second scan period SS may include a second non-emission period ND2 during which the pixel PX does not emit light and a second emission period DD2 during which the pixel PX emits light. The second non-emission period ND2 may include a fifth period P5 and a sixth period P6. The second scan period SS may not include a compensation period corresponding to the second period P2 of the first scan period AS and a writing period corresponding to the third period P3 of the first scan period AS.

Each of the first gate signal GW, the second gate signal GI, the third gate signal GR, the fourth gate signal GB, the fifth gate signal EM, and the sixth gate signal EMB may have a high-level voltage (a first level voltage) during some periods and may have a low-level voltage (a second level voltage) during some periods.

The fifth period P5 may be a third initialization period for initializing the third node N3 to which the pixel electrode of the organic light-emitting diode OLED is connected. The fifth period P5 may correspond to the first period P1 of the first scan period AS. During the fifth period P5, the fourth gate signal GB of an on voltage may be supplied to the fourth gate line GBL. The first gate signal GW, the second gate signal GI, the third gate signal GR, the fifth gate signal EM, and the sixth gate signal EMB may be supplied as off voltages. The seventh transistor T7 may be turned on by the fourth gate signal GB, and the third node N3, that is, the pixel electrode of the organic light-emitting diode OLED, may be initialized to the second initialization voltage Vaint by the turned-on seventh transistor T7.

The sixth period P6 may be a fourth initialization period for initializing the third node N3 to which the pixel electrode of the organic light-emitting diode OLED is connected prior to the second emission period DD2. The sixth period P6 may correspond to the fourth period P4 of the first scan period AS. During the sixth period P6, the fourth gate signal GB of an on voltage may be supplied to the fourth gate line GBL. The first gate signal GW, the second gate signal GI, the third gate signal GR, the fifth gate signal EM, and the sixth gate signal EMB may be supplied as off voltages. The seventh transistor T7 may be turned on by the fourth gate signal GB, and the third node N3, that is, the pixel electrode of the organic light-emitting diode OLED, may be initialized to the second initialization voltage Vaint by the turned-on seventh transistor T7.

The second emission period DD2 may be a period during which the organic light-emitting diode OLED emits light. The second emission period DD2 may correspond to the first emission period DD1 of the first scan period AS. During the second emission period DD2, the fifth gate signal EM of an on voltage may be supplied to the fifth gate line EML, and the sixth gate signal EMB of an on voltage may be supplied to the sixth gate line EMBL. The first gate signal GW, the second gate signal GI, the third gate signal GR, and the fourth gate signal GB may be off voltages.

During the second emission period DD2, the fifth transistor T5 may be turned on by the fifth gate signal EM, and the first driving voltage ELVDD may be supplied to the first terminal of the first transistor T1 by the turned-on fifth transistor T5. The sixth transistor T6 may be turned on by the sixth gate signal EMB, and the first transistor T1 may be configured to output a driving current having the magnitude corresponding to a voltage stored in the first capacitor C1, that is, the data signal Vdata, and the organic light-emitting diode OLED may emit light at brightness corresponding to the magnitude of the driving current Id. The data signal Vdata stored in the first capacitor C1 during the second emission period DD2 may be a signal in which the data signal supplied to the pixel during the third period P3 of the first scan period AS is maintained.

In a state in which the first initialization voltage Vint and the second initialization voltage Vaint are applied to the second node N2 and the third node N3, that is, to the first terminal and the second terminal of the sixth transistor T6, respectively, in case that the on voltages of the fifth gate signal EM and the sixth gate signal EMB are applied at the same timing, a voltage of the third node N3 may be changed to a voltage lower than the second initialization voltage Vaint due to a voltage difference between the first terminal and the second terminal of the sixth transistor T6. Accordingly, the effect of minimizing a flicker phenomenon may be decreased by initializing the third node N3 to the second initialization voltage Vaint higher than the first initialization voltage Vint. According to an embodiment, during each of the first emission period DD1 and the second emission period DD2, an on-voltage application timing of the sixth gate signal EMB may be delayed by a certain time DT from an on-voltage application timing of the fifth gate signal EM. After the on voltage of the fifth gate signal EM is first applied to increase a voltage level of a voltage applied to the first terminal of the sixth transistor T6, the on voltage of the sixth gate signal EMB may be applied, and thus, a voltage difference between the first terminal and the second terminal of the sixth transistor T6 may be reduced, thereby minimizing voltage fluctuations of the third node N3 and minimizing a flicker phenomenon.

According to an embodiment, by performing initialization of the pixel electrode before and after a compensation period, respectively, in a similar way to the first scan period AS during the second scan period SS, even in case that one or more second scan periods SS are included in one frame, a luminance deviation according to a driving speed may be minimized. By performing initialization of a driving transistor only during the first scan period AS, occurrence of spots (mura) due to a voltage drop of a first initialization voltage of the screen may be minimized.

In an above-described embodiment, during one frame, the first gate signal GW, the second gate signal GI, and the third gate signal GR may be supplied only during the first scan period AS, and the fourth gate signal GB may be supplied during the first scan period AS and the second scan period SS. The fifth gate signal EM and the sixth gate signal EMB may be supplied during the first scan period AS and the second scan period SS. For example, during one frame, periods of the first gate signal GW, the second gate signal GI, and the third gate signal GR may be 1 cycle, and periods of the fourth gate signal GB, the fifth gate signal EM, and the sixth gate signal EMB may be 2 cycles.

For example, the first gate signal GW may be supplied to the pixel at the period of 1 cycle during one frame by being once supplied to a pixel only during the third period P3 of the first scan period AS during one frame. The second gate signal GI may be supplied to the pixel at the period of 1 cycle during one frame by being twice supplied to the pixel only during the first period P1 and the fourth period P4 of the first scan period AS during one frame. The third gate signal GR may be supplied to the pixel at the period of 1 cycle during one frame by being once supplied to the pixel continuously only during the first period P1 and the second period P2 of the first scan period AS during one frame. The fourth gate signal GB may be supplied to the pixel at the period of 2 cycles during one frame by being supplied to the pixel twice during the first period P1 and the fourth period P4 of the first scan period AS and twice during the fifth period P5 and the sixth period P6 of the second scan period SS, that is, four times in total during one frame. The fifth gate signal EM may be supplied to the pixel at the period of 2 cycles during one frame by being supplied to the pixel twice during the second period P2 and the first emission period DD1 of the first scan period AS and once during the second emission period DD2 of the second scan period SS, that is, three times in total during one frame. The sixth gate signal EMB may be supplied to the pixel at the period of 2 cycles during one frame by being supplied to the pixel once during the first emission period DD1 of the first scan period AS and once during the second emission period DD2 of the second scan period SS, that is, twice in total during one frame.

In another embodiment, the fourth period P4 of the first scan period AS and the sixth period P6 of the second scan period SS may be omitted. The second gate signal GI may be supplied to the pixel at the period of 1 cycle during one frame by being once supplied to a pixel only during the first period P1 of the first scan period AS during one frame. The fourth gate signal GB may be supplied to the pixel at the period of 2 cycles during one frame by being supplied to the pixel once during the first period P1 of the first scan period AS and once during the fifth period P5 of the second scan period SS, that is, twice in total during one frame.

Figure 8:
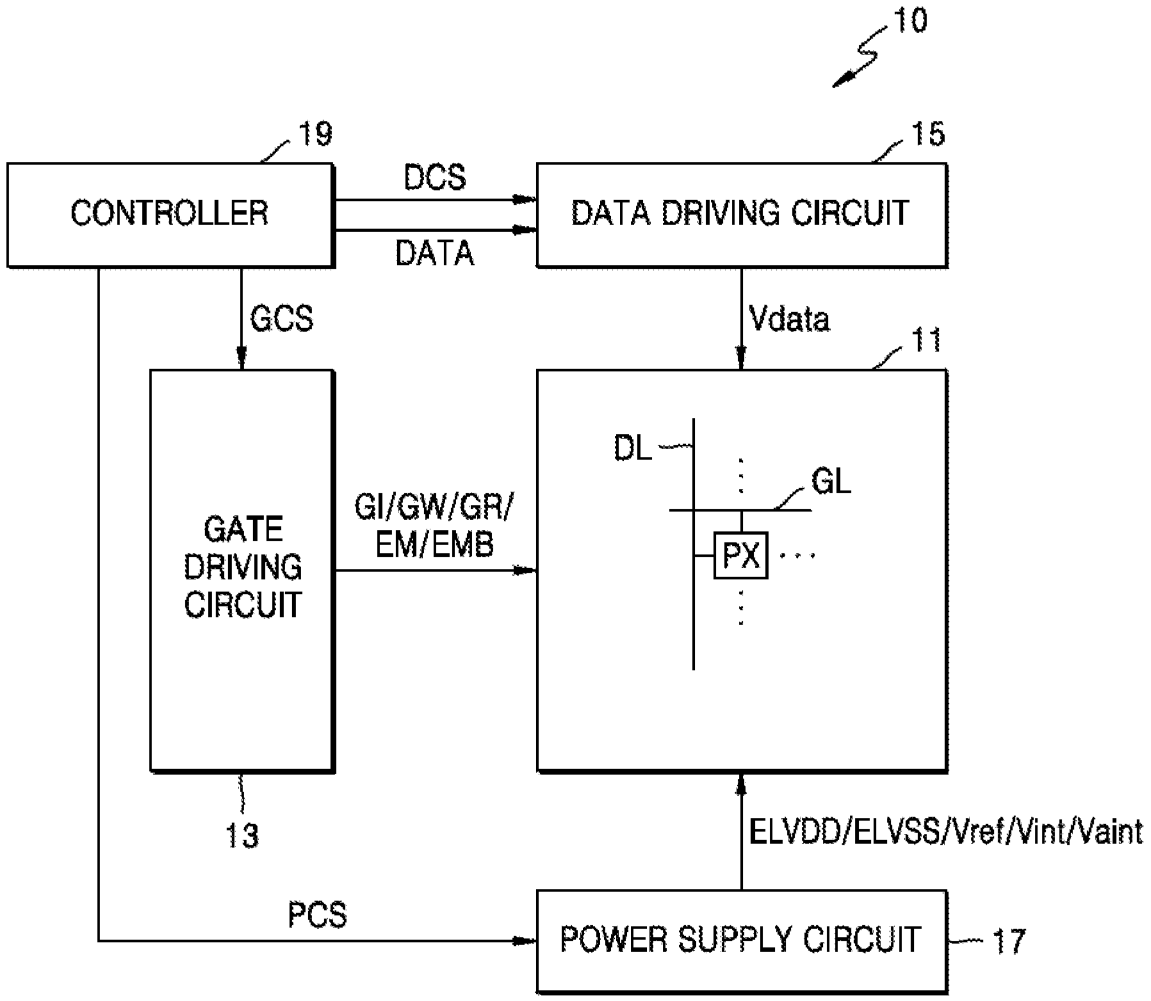
FIG. 8 is a schematic diagram of a display apparatus according to an embodiment.
Figure 9:
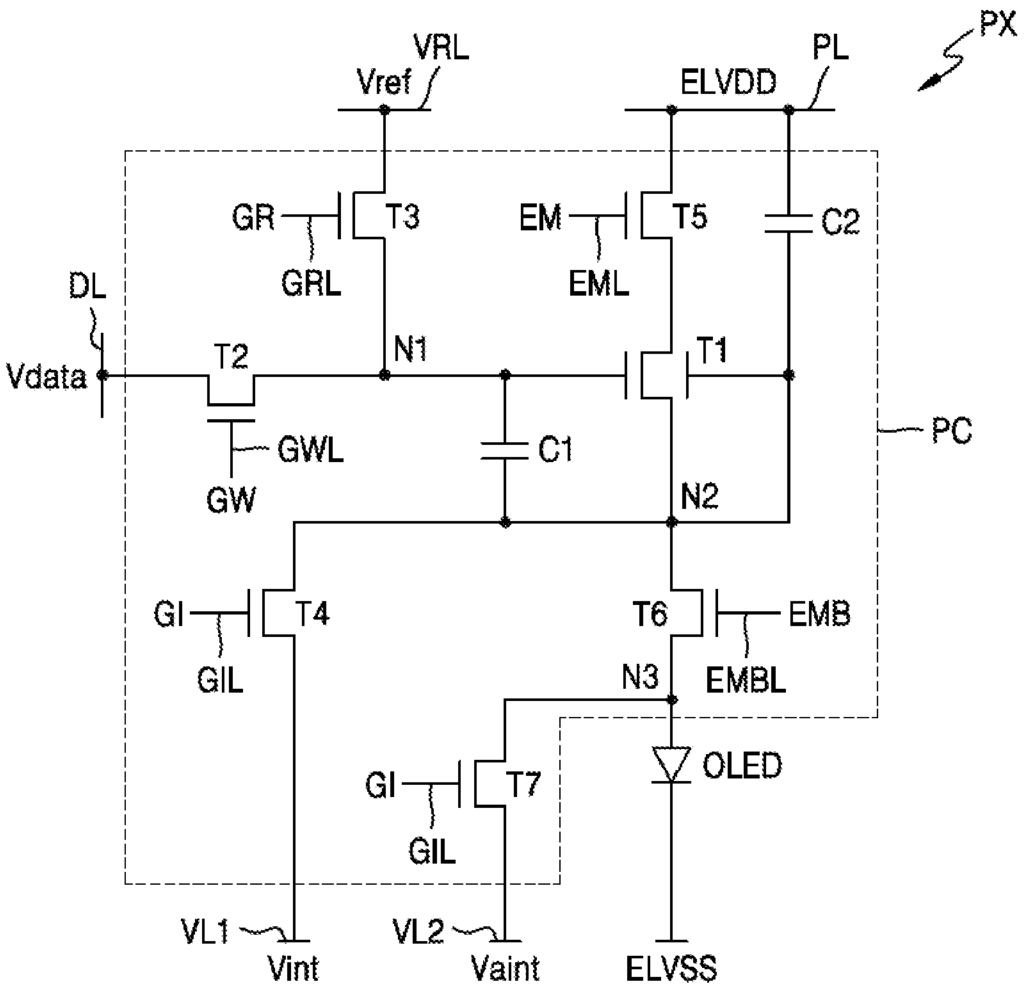
FIG. 9 is a schematic diagram of an equivalent circuit of a pixel according to an embodiment.
Figure 10:
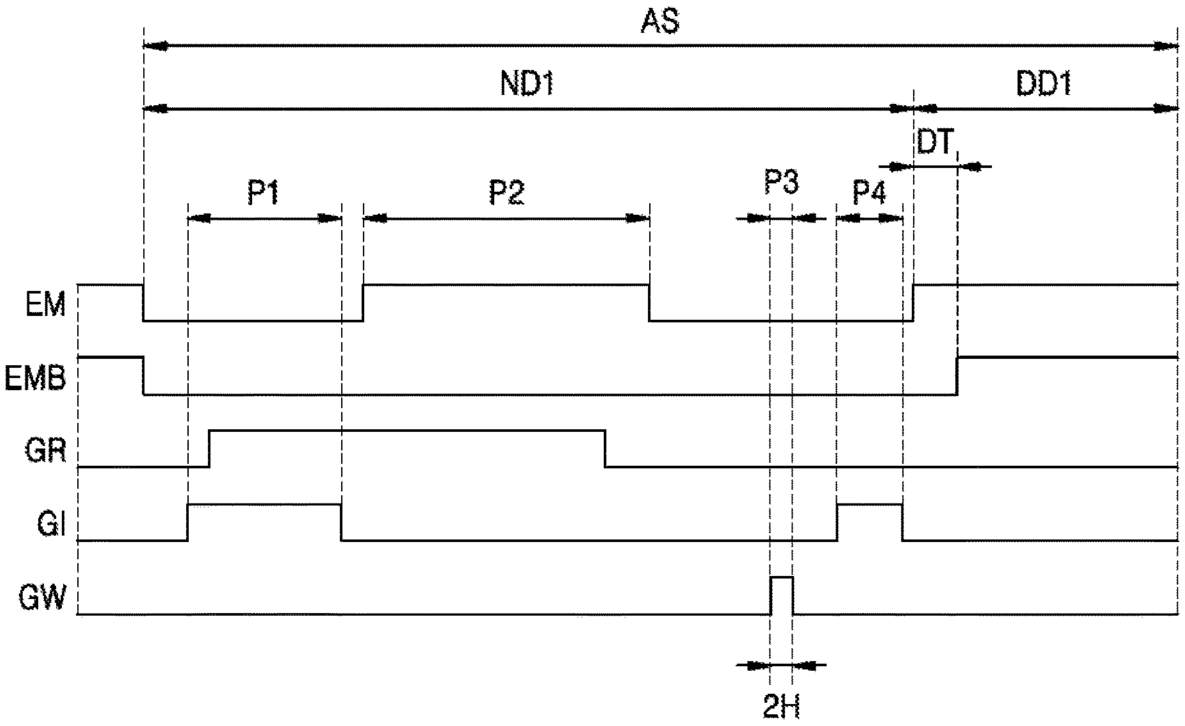
FIGS. 10 and 11 are diagrams schematically showing the signals for describing operations of the pixel shown in FIG. 9.
Figure 11:
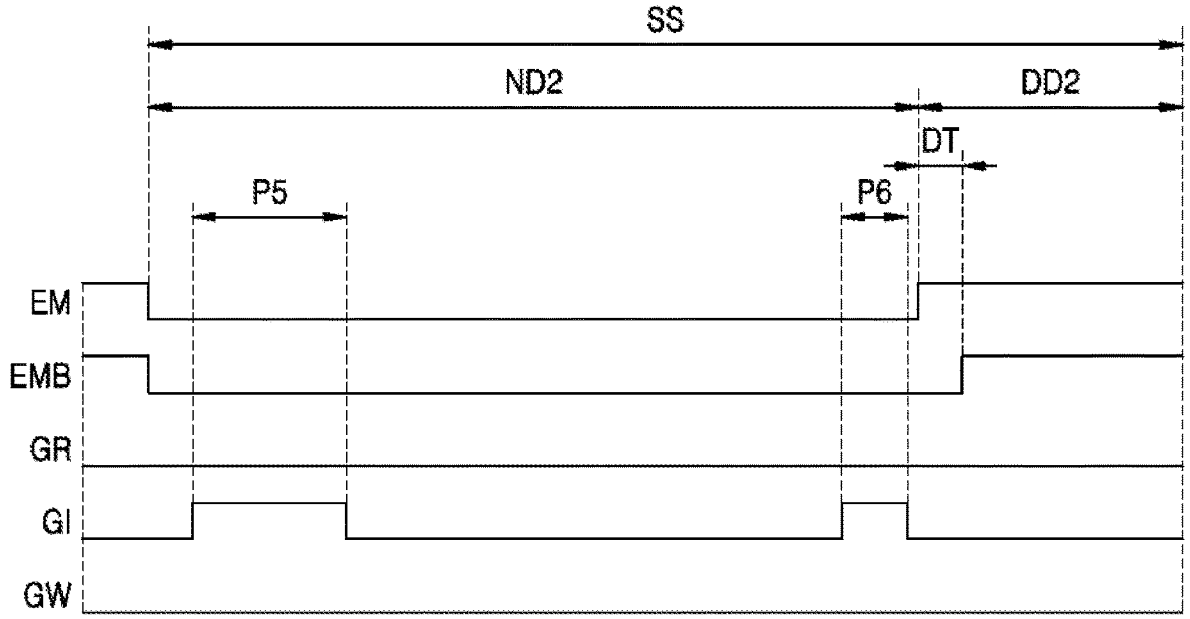

FIG. 8 is a schematic diagram of the display apparatus 10 according to an embodiment. FIG. 9 is a schematic diagram of an equivalent circuit of the pixel PX according to an embodiment. FIGS. 10 and 11 are diagrams schematically showing the signals for describing operations of the pixel PX shown in FIG. 9. Hereinafter, differences from an embodiment described with reference to FIGS. 2 to 7 will be described, and redundant descriptions thereof will be omitted.

The display apparatus 10 shown in FIG. 8 may be different from the display apparatus 10 shown in FIG. 2 at least in terms of signals output by the gate driving circuit 13 and the power supply circuit 17. For example, the pixel PX may be connected to multiple gate lines, and the gate driving circuit 13 may be configured to apply the first gate signal GW, the second gate signal GI, the third gate signal GR, the fifth gate signal EM, and the sixth gate signal EMB to respectively corresponding first gate lines, second gate lines, third gate lines, fifth gate lines, and sixth gate lines. The power supply circuit 17 may be configured to generate the first driving voltage ELVDD, the second driving voltage ELVSS, the reference voltage Vref, the first initialization voltage Vint, and the second initialization voltage Vaint and supply the same to the pixels PX.

The pixel PX shown in FIG. 9 may be an embodiment of the pixel PX shown in FIG. 8. Referring to FIG. 9, the pixel PX may include the organic light-emitting diode OLED and the pixel circuit PC connected to the organic light-emitting diode OLED. The pixel circuit PC may include the first to seventh transistors T1 to T7 and the first and second capacitors C1 and C2.

The pixel PX shown in FIG. 9 and the pixel PX shown in FIG. 4 are different from each other. In the pixel PX shown in FIG. 4, the gate of the seventh transistor T7 may be connected to the fourth gate line GBL, and in the pixel PX shown in FIG. 9, the gate of the seventh transistor T7 may be connected to the second gate line GIL. In the pixel PX shown in FIG. 9, in case that the second gate signal GI is applied to the second gate line GIL as an on voltage, the fourth transistor T4 and the seventh transistor T7 may be turned on simultaneously.

As shown in FIGS. 3A and 3B, the pixel PX shown in FIG. 9 may operate in one first scan period AS and at least one second scan periods SS during one frame 1F. As shown in FIG. 10, the pixel PX may operate in the first non-emission period ND1 and the first emission period DD1 during the first scan period AS and may operate in the second non-emission period ND2 and the second emission period DD2 during the second scan period SS.

As shown in FIG. 10, the first non-emission period ND1 may include the first period P1, the second period P2, the third period P3, and the fourth period P4. In another embodiment, the fourth period P4 may be omitted.

During the first period P1, the second gate signal GI of an on voltage may be supplied to the second gate line GIL to turn on the fourth transistor T4 and the seventh transistor T7, and the third gate signal GR of an on voltage may be supplied to the third gate line GRL to turn on the third transistor T3. Accordingly, the second node N2 to which the second terminal of the first transistor T1 is connected may be initialized to the first initialization voltage Vint, and the third node N3 to which the pixel electrode of the organic light-emitting diode OLED is connected may be initialized to the second initialization voltage Vaint. The first gate of the first transistor T1 may be initialized to the reference voltage Vref.

During the second period P2, the third gate signal GR of an on voltage may be supplied to the third gate line GRL to turn on the third transistor T3, and the fifth gate signal EM may be supplied to the fifth gate line EML to turn on the fifth transistor T5. Accordingly, the reference voltage Vref may be supplied to the first node N1, and the first driving voltage ELVDD may be supplied to the first terminal of the first transistor T1, and thus, the first transistor T1 may be turned on, and a voltage corresponding to the threshold voltage Vth of the first transistor T1 may be stored in the first capacitor C1 to compensate for the threshold voltage Vth of the first transistor T1.

During the third period P3, the first gate signal GW of an on voltage may be supplied to the first gate line GWL to turn on the second transistor T2. Accordingly, the data signal Vdata from the data line DL may be transmitted to the first gate of the first transistor T1, and the first capacitor C1 may be charged with a voltage corresponding to the threshold voltage Vth of the first transistor T1 and the data signal Vdata.

During the fourth period P4, the second gate signal GI of an on voltage may be supplied to the second gate line GIL to turn on the fourth transistor T4 and the seventh transistor T7. Accordingly, the second node N2 to which the second terminal of the first transistor T1 is connected may be initialized to the first initialization voltage Vint, and the third node N3 to which the pixel electrode of the organic light-emitting diode OLED is connected may be initialized to the second initialization voltage Vaint.

During the first emission period DD1, the fifth gate signal EM of an on voltage may be supplied to the fifth gate line EML to turn on the fifth transistor T5, and the sixth gate signal EMB of an on voltage may be supplied to the sixth gate line EMBL to turn on the sixth transistor T6. In this regard, an on-voltage application timing of the sixth gate signal EMB may be delayed by the certain time DT from an on-voltage application timing of the fifth gate signal EM. During the first emission period DD1, the organic light-emitting diode OLED may emit light at brightness corresponding to the magnitude of driving current corresponding to the data signal Vdata.

As shown in FIG. 11, the second non-emission period ND2 may include the fifth period P5 and the sixth period P6. In another embodiment, the sixth period P6 may be omitted.

During the fifth period P5, the second gate signal GI of an on voltage may be supplied to the second gate line GIL to turn on the fourth transistor T4 and the seventh transistor T7. Accordingly, the second node N2 to which the second terminal of the first transistor T1 is connected may be initialized to the first initialization voltage Vint, and the third node N3 to which the pixel electrode of the organic light-emitting diode OLED is connected may be initialized to the second initialization voltage Vaint.

During the sixth period P6, the second gate signal GI of an on voltage may be supplied to the second gate line GIL to turn on the fourth transistor T4 and the seventh transistor T7. Accordingly, the second node N2 to which the second terminal of the first transistor T1 is connected may be initialized to the first initialization voltage Vint, and the third node N3 to which the pixel electrode of the organic light-emitting diode OLED is connected may be initialized to the second initialization voltage Vaint.

During the second emission period DD2, the fifth gate signal EM of an on voltage may be supplied to the fifth gate line EML to turn on the fifth transistor T5, and the sixth gate signal EMB of an on voltage may be supplied to the sixth gate line EMBL to turn on the sixth transistor T6. In this regard, an on-voltage application timing of the sixth gate signal EMB may be delayed by the certain time DT from an on-voltage application timing of the fifth gate signal EM. During the second emission period DD2, the organic light-emitting diode OLED may emit light at brightness corresponding to the magnitude of driving current corresponding to the data signal Vdata.

In the description, when a signal is referred to as being supplied, it may mean that an on voltage (e.g., a high-level voltage) is supplied, and when a signal is referred to as not being supplied, it may mean that an off voltage (e.g., a low-level voltage) is supplied.

According to an embodiment, a display apparatus may be provided in which, in a pixel circuit only composed of oxide semiconductor transistors, a difference in luminance between driving frequencies is not recognized during variable frequency driving by periodically inserting a period for initializing an anode of an organic light-emitting diode according to a driving frequency.

According to an embodiment, a flicker phenomenon of an organic light-emitting diode may be minimized by differing on-voltage application timings of emission control signals (e.g., the fifth gate signal EM applied to the gate of the fifth transistor T5 and the sixth gate signal EMB applied to the gate of the sixth transistor T6) supplied to a pixel during an emission period of the organic light-emitting diode.

According to an embodiment, a screen mura phenomenon due to a drop of an initialization voltage used to initialize a driving transistor may be minimized by supplying a gate signal for initialization of a driving transistor (e.g., the second gate signal GI applied to the gate of the fourth transistor T4) to a pixel at the period of 1 cycle during one frame and supplying a gate signal for initialization of a pixel electrode of an organic light-emitting diode (e.g., the fourth gate signal GB applied to the gate of the seventh transistor T7) to the pixel at the period of 2 cycles during one frame.

According to an embodiment, a display apparatus may be provided in which a difference in luminance between driving frequencies is not recognized during variable frequency driving by periodically inserting (e.g., before an emission period) a period for initializing a pixel electrode of an organic light-emitting diode according to a driving frequency.

According to an embodiment, a display apparatus with improved display quality may be provided. However, embodiments are not limited by such an effect.

It should be understood that embodiments described herein should be considered in a descriptive sense only and not for purposes of limitation. Descriptions of features or aspects within each embodiment should typically be considered as available for other similar features or aspects in other embodiments. While embodiments have been described with reference to the figures, it will be understood by those of ordinary skill in the art that various changes in form and details may be made therein without departing from the spirit and scope of this disclosure.

What is claimed is:

1. A display apparatus, comprising:
- a plurality of pixels, each of the plurality of pixels comprising:
  - a driving transistor comprising:
    - a first terminal;
    - a second terminal;
    - a first gate; and

- a second gate electrically connected to the second terminal;
  - a first capacitor electrically connected to the first gate of the driving transistor and the second terminal of the driving transistor;
  - a second capacitor electrically connected to a driving voltage line and the second terminal of the driving transistor;
  - a first initialization transistor electrically connected to the second terminal of the driving transistor and a first initialization voltage line; and
  - a second initialization transistor electrically connected to a light-emitting diode and a second initialization voltage line, wherein
- one frame comprises:
  - a first scan period comprising:
    - a first non-emission period; and
    - a first emission period; and
  - a second scan period comprising:
    - a second non-emission period; and
    - a second emission period,
- a first gate signal is applied to a gate of the first initialization transistor during the first non-emission period of the one frame, and
- a second gate signal is applied to a gate of the second initialization transistor during each of the first non-emission period and the second non-emission period, the second gate signal being different from the first gate signal.

2. The display apparatus of claim 1, wherein the first gate signal is applied to the gate of the first initialization transistor only during the first non-emission period of the one frame.

3. The display apparatus of claim 1, wherein each of the plurality of pixels further comprises:
- a first transistor electrically connected to a data line and the first gate of the driving transistor;
- a second transistor electrically connected to a reference voltage line and the first gate of the driving transistor;
- a third transistor electrically connected to the driving voltage line and the first terminal of the driving transistor; and
- a fourth transistor electrically connected to the second terminal of the driving transistor and the light-emitting diode.

4. The display apparatus of claim 3, wherein
- the first non-emission period comprises:
  - a writing period during which a third gate signal is applied to a gate of the first transistor; and
  - a first period before the writing period, during which the first gate signal is applied to the gate of the first initialization transistor, the second gate signal is applied to the gate of the second initialization transistor, and a fourth gate signal is applied to a gate of the second transistor, and
- the second non-emission period comprises a second period during which the second gate signal is applied to the gate of the second initialization transistor.

5. The display apparatus of claim 4, wherein the first non-emission period further comprises a third period between the writing period and the first period, during which the fourth gate signal is applied to the gate of the second transistor, and a fifth gate signal is applied to a gate of the third transistor.

6. The display apparatus of claim 5, wherein
- the first non-emission period further comprises a fourth period between the writing period and the first emission period, during which the first gate signal is applied to the gate of the first initialization transistor, and the second gate signal is applied to the gate of the second initialization transistor, and the second non-emission period further comprises a fifth period between the second period and the second emission period, during which the second gate signal is applied to the gate of the second initialization transistor.

7. The display apparatus of claim 4, wherein during the first emission period, a fifth gate signal is applied to a gate of the third transistor, and a sixth gate signal is applied to a gate of the fourth transistor, and a timing of application of the fifth gate signal and a timing of application of the sixth gate signal are different from each other.

8. The display apparatus of claim 7, wherein the timing of application of the fifth gate signal precedes the timing of application of the sixth gate signal.

9. The display apparatus of claim 1, wherein a level of a second initialization voltage applied to the second initialization voltage line is higher than a level of a first initialization voltage applied to the first initialization voltage line.

10. A display apparatus, comprising:

a plurality of pixels, each of the plurality of pixels comprising:

a driving transistor comprising:

a first terminal;

a second terminal;

a first gate; and a second gate electrically connected to the second terminal;

a first transistor electrically connected to a driving voltage line and the first terminal of the driving transistor;

a second transistor electrically connected to the second terminal of the driving transistor and a light-emitting diode;

a first capacitor electrically connected to the first gate of the driving transistor and the second terminal of the driving transistor; and a second capacitor electrically connected to the driving voltage line and the second terminal of the driving transistor, wherein, during an emission period of the light-emitting diode after a writing period in which a voltage is charged to the first capacitor, a timing at which a first gate signal is applied to a gate of the first transistor and a timing at which a second gate signal is applied to a gate of the second transistor are different from each other.

11. The display apparatus of claim 10, wherein the timing of application of the first gate signal precedes the timing of application of the second gate signal.

12. The display apparatus of claim 10, wherein each of the plurality of pixels further comprises:

a third transistor electrically connected to a data line and the first gate of the driving transistor;

a fourth transistor electrically connected to a reference voltage line and the first gate of the driving transistor;

a fifth transistor electrically connected to the second terminal of the driving transistor and a first initialization voltage line; and a sixth transistor electrically connected to the light-emitting diode and a second initialization voltage line.

13. The display apparatus of claim 12, wherein one frame comprises:

a first scan period comprising:

a first non-emission period; and a first emission period of the emission period; and a second scan period comprising:

a second non-emission period; and a second emission period of the emission period, a third gate signal is applied to a gate of the fifth transistor only during the first non-emission period of the one frame, and a fourth gate signal is applied to a gate of the sixth transistor during each of the first non-emission period and the second non-emission period.

14. The display apparatus of claim 13, wherein the first non-emission period comprises:

the writing period during which a fifth gate signal is applied to a gate of the third transistor; and a first period before the writing period, during which the third gate signal is applied to the gate of the fifth transistor, the fourth gate signal is applied to the gate of the sixth transistor, and a sixth gate signal is applied to a gate of the fourth transistor, and the second non-emission period comprises a second period during which the fourth gate signal is applied to the gate of the sixth transistor.

15. The display apparatus of claim 14, wherein the first non-emission period further comprises a third period between the writing period and the first period, during which the first gate signal is applied to the gate of the first transistor, and the sixth gate signal is applied to the gate of the fourth transistor.

16. The display apparatus of claim 15, wherein the first non-emission period further comprises a fourth period between the writing period and the first emission period, during which the third gate signal is applied to the gate of the fifth transistor, and the fourth gate signal is applied to the gate of the sixth transistor, and the second non-emission period further comprises a fifth period between the second period and the second emission period, during which the fourth gate signal is applied to the gate of the sixth transistor.

17. The display apparatus of claim 12, wherein one frame comprises:

a first scan period comprising:

a first non-emission period; and a first emission period of the emission period; and a second scan period comprising:

a second non-emission period; and a second emission period of the emission period, and during each of the first non-emission period and the second non-emission period of the one frame, a third gate signal is applied to a gate of the fifth transistor and a gate of the sixth transistor, twice by a certain interval.

18. The display apparatus of claim 17, wherein the first non-emission period comprises:

the writing period during which a fourth gate signal is applied to a gate of the third transistor; and a first period before the writing period, during which the third gate signal is applied to the gate of the fifth transistor and the gate of the sixth transistor, and the second non-emission period comprises:

a second period during which the third gate signal is applied to the gate of the fifth transistor and the gate of the sixth transistor.

19. The display apparatus of claim 18, wherein the first non-emission period further comprises a third period between the writing period and the first period, during which the first gate signal is applied to the gate of the first transistor, and a fifth gate signal is applied to a gate of the fourth transistor.

20. The display apparatus of claim 18, wherein the first non-emission period further comprises:

a fourth period between the writing period and the first emission period, during which the third gate signal is applied to the gate of the fifth transistor and the gate of the sixth transistor, and the second non-emission period further comprises a fifth period between the second period and the second emission period, during which the third gate signal is applied to the gate of the fifth transistor and the gate of the sixth transistor.

21. The display apparatus of claim 12, wherein a level of a first initialization voltage applied to the first initialization voltage line is lower than a level of a second initialization voltage applied to the second initialization voltage line.

* * * * *